United States Patent [19]
Fisher

[11] 4,148,507
[45] Apr. 10, 1979

[54] SYMBOLS FOR IDENTIFYING CHARACTERISTICS

[76] Inventor: Howard T. Fisher, 67 Sparks St., Cambridge, Mass. 02138

[21] Appl. No.: 584,938

[22] Filed: Jun. 9, 1976

Related U.S. Application Data

[63] Continuation of Ser. No. 98,573, Dec. 16, 1970, abandoned.

[51] Int. Cl.² ............................................. G09B 29/00
[52] U.S. Cl. .................................... 283/34; 35/24 R; 35/26
[58] Field of Search ................... 183/34; 35/24 R, 31, 35/26–28; 101/372, 373, 397, 399; 273/152 R; 33/174 B

[56] References Cited

U.S. PATENT DOCUMENTS

| | | | |
|---|---|---|---|
| 58,748 | 10/1866 | Apgar et al. | 283/34 X |
| 1,512,598 | 10/1924 | Harriman | 283/34 |
| 2,924,895 | 2/1960 | Bachi | 35/24 |

*Primary Examiner*—Jerome Schnall

[57] ABSTRACT

Presenting a plurality of characteristics by presenting each characteristic using a symbol which per se identifies the characteristic by three concurrent visual impressions (quantity, tone, and extent) and is adaptable for use with any desired grey or tone scale.

8 Claims, 9 Drawing Figures

SYMBOLS FOR IDENTIFYING CHARACTERISTICS

This is a continuation of application Ser. No. 98,573, filed Dec. 16, 1970, now abandoned.

This invention relates to the presentation of data.

In the presentation of data by map, graph, or the like, it is generally necessary to illustrate a number of different qualitative or quantitative characteristics or values. If the presentation is to be useful, a sufficient range of characteristics must be presented to make each characteristic meaningful, and each characteristic must be presented in a manner that is distinct from the presentation of every other characteristic. For example, a population density map may be required to present six classes or levels of population density. If fewer levels are presented, the information provided by the map will be too gross to be useful. If each level is not presented in a distinct and easily grasped manner, the various levels may be confused.

A presentation further, if it is to be easily read and understood, should present each characteristic in a manner which per se indicates the relative position or level of that characteristic vis-a-vis the other presented characteristics. To continue the example of the six-level population map, the third level of population density (perhaps the density of the State of Colorado) should be presented in such a manner that the reader viewing the map can, simply by looking at the presentation of Colorado, tell not only that the population of Colorado is more dense than that of Alaska and less dense than that of New York, but also that Colorado is in the third of the levels presented.

It is a primary object of the present invention to provide a novel and greatly improved system of presentation by which many different characteristics can be presented in a manner which, by three concurrent visual impressions (quantity, tone, and extent), differentiates between and per se identifies each characteristic. Other objects include providing, for use in and in devices for producing such systems, a novel set of symbols whose particular planar configurations yield far more accurate readability and is adaptable for use with any desired tone or grey scale.

The invention features any of the symbols of FIGS. 2 through 7, presentations of characteristics comprising a regular array of any of the symbols of FIGS. 2 through 7 on a contrasting background, and devices for producing any such presentations. Preferred embodiments feature sets including several of the symbols; presentations of a number of levels or classes of characteristics including a plurality of areas of any required shape, each of which presents one characteristic and comprises a regular array of one of the symbols; and devices for producing such presentations.

Other objects, features, and advantages will appear from the following detailed description of a preferred embodiment of the invention, taken together with the attached drawings in which.

Figure 1:
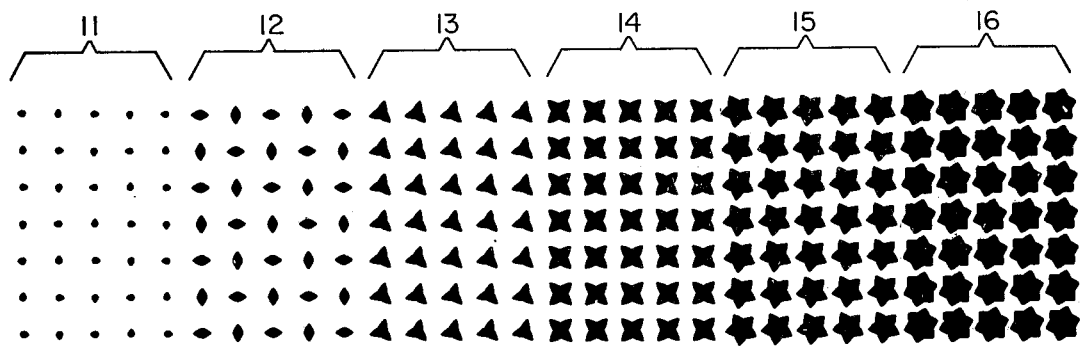
FIG. 1 illustrates a system for presenting six characteristics according to the present invention.

Referring more particularly to the drawings, FIG. 1 comprises six areas, designated 11, 12, 13, 14, 15, and 16, each of which presents a different predetermined characteristic and comprises a regular array of identical black symbols on a white background. In a population map such as that of the previous example, the states having the lowest population density (in the example including Alaska) would be presented in the manner of area 11, the states of the next higher population density in the manner of area 12, the states of the third level of population density (in the example including Colorado) in the manner of area 13, and so on, the states of highest population density (in the example including New York) being presented in the manner of area 16.

Figures 2, 3, 4, 5, 6, 7:
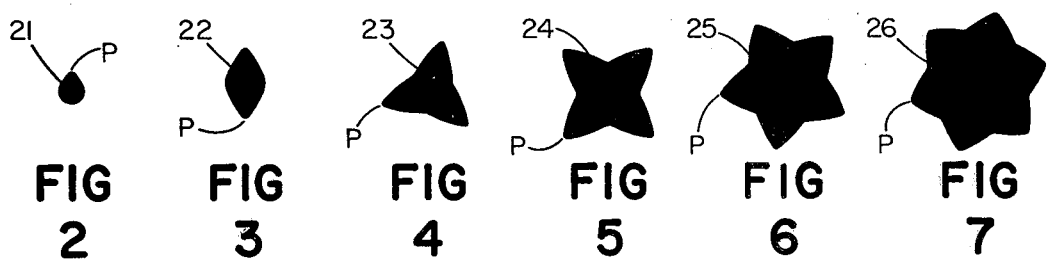
FIGS. 2–7 are enlarged views of the symbols of the system of FIG. 1.

Each symbol 21 in the array of area 11 has the configuration shown in FIG. 2, the symbol there being enlarged approximately four times from FIG. 1. The symbols 22–26 of the arrays of areas 12–16 are respectively shown, enlarged to the same extent, in FIGS. 3–7. As shown, each symbol has a definite number of sharp outward projections P, and the extent or area of the symbols increases according to the number of projections. The number of projections and the approximate relative extent of the symbols of FIGS. 2–7 are as follows:

| Symbol | Number of Projections | Relative Extent |
|---|---|---|
| 21 | 1 | 1 |
| 22 | 2 | 2.8 |
| 23 | 3 | 5.5 |
| 24 | 4 | 9.1 |
| 25 | 5 | 13.6 |
| 26 | 6 | 18.7 |

The exact extent of the different symbols will depend, as explained in more detail hereinafter, on the selected tone (lightness or darkness, with or without hue and intensity of hue variation) or grey scale and on the number of characteristics presented. For any scale or number, however, the symbol with the greater number of projections will have the greater extent.

Referring again to FIG. 1, each of areas 11–16 includes 35 symbols regularly arranged in a 5 by 7 array. As illustrated, the symbols are arranged so that the centers of adjacent sets of four symbols define the corners of a square. Alternatively, the symbols may be regularly arranged so that the centers of adjacent sets of three symbols define the corners of an equilateral triangle. The center-to-center spacing of the symbols is the same in all of areas 11–16. In a typical presentation, the symbols will be spaced to provide approximately 18 to 36 symbols per inch. In FIG. 1, the number of symbols per inch has been substantially increased for purposes of clarity.

As the symbols of the different areas are spaced at the same interval, the size of the character spaces (in a square array $(1/n)^2$ sq. in. where n is the number of symbols per inch) of areas 11 through 16 is the same. The percentage of each character space that is black (covered by a symbol) as opposed to white (not covered by a symbol) depends on the size of the symbol within the particular character space. The tone of each of areas 11 through 16, each area consisting of a plurality of identical character spaces, depends on these relative percentages of white and black which, in FIG. 1, are approximately as follows:

| Area | % Black | % White |
|------|---------|---------|
| 11   | 3.1     | 96.9    |
| 12   | 8.7     | 91.3    |
| 13   | 17.0    | 83.0    |
| 14   | 28.1    | 71.9    |
| 15   | 42.0    | 58.0    |
| 16   | 58.0    | 42.0    |

It should be noted that the absolute or percentage increase in the percentage of black between adjacent areas is not constant. If the difference in tone between areas is to appear visually equal, the actual difference in the amount of black should be greater when the percentages of white and black are approximately equal than when they are greatly different. As explained in more detail hereinafter, one major advantage of the symbols of the present system is the ability to adjust the tone of the areas in any desired manner, while at the same time preserving the relative extent and quantitative quality of the symbols themselves.

Figure 8:
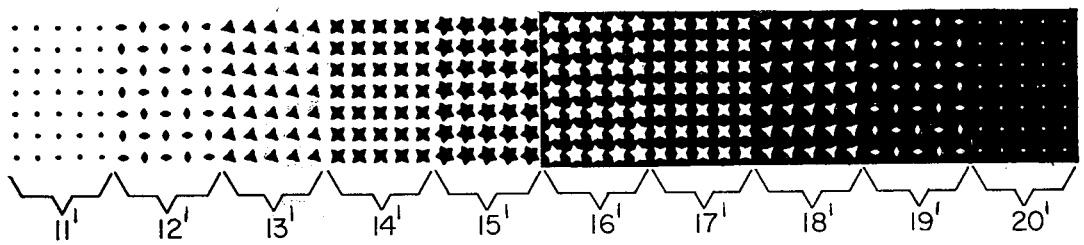
FIG. 8 illustrates a system for presenting ten characteristics according to the present invention; and, FIG. 9 illustrates the scale used in determining the area tone and symbol extent of the systems of FIGS. 1 and 8.

Reference is now made to FIG. 8 which illustrates a system for presenting ten characteristics according to the present invention. As shown, FIG. 8 comprises ten areas, designated 11' through 20', each of which presents a different predetermined characteristic. Except for a slight reduction in overall size (e.g., slightly more symbols or character spaces per inch), areas 11' through 15' are identical to, respectively, areas 11 through 15 of FIG. 1. Each of areas 16' through 20' comprises a regular array of identical white symbols on a black background. Each symbol of the array of area 16' is identical, other than in color and, as required to preserve inter-symbol spacing, angular orientation, to symbol 25. The symbols of the arrays of areas 17' through 20' similarly are identical, other than in color, and in area 18' angular orientation, to symbols 24, 23, 22, and 21, respectively. As in the system of FIG. 1, the tone of areas 11'-20' depends on the relative percentages of white and black in each area or character space, which percentages in the system of FIG. 8 are approximately as follows:

| Area | % Black | % White |
|------|---------|---------|
| 11'  | 3.1     | 96.9    |
| 12'  | 8.7     | 91.3    |
| 13'  | 17.0    | 83.0    |
| 14'  | 28.1    | 71.9    |
| 15'  | 42.0    | 58.0    |
| 16'  | 58.0    | 42.0    |
| 17'  | 71.9    | 28.1    |
| 18'  | 83.0    | 17.0    |
| 19'  | 91.3    | 8.7     |
| 20'  | 96.9    | 3.1     |

It should be noted that area 16', which comprises a regular array of white symbols 25 on a black background, and area 16, which comprises a regular array of black symbols on a white background, have the same tone.

Figure 9:
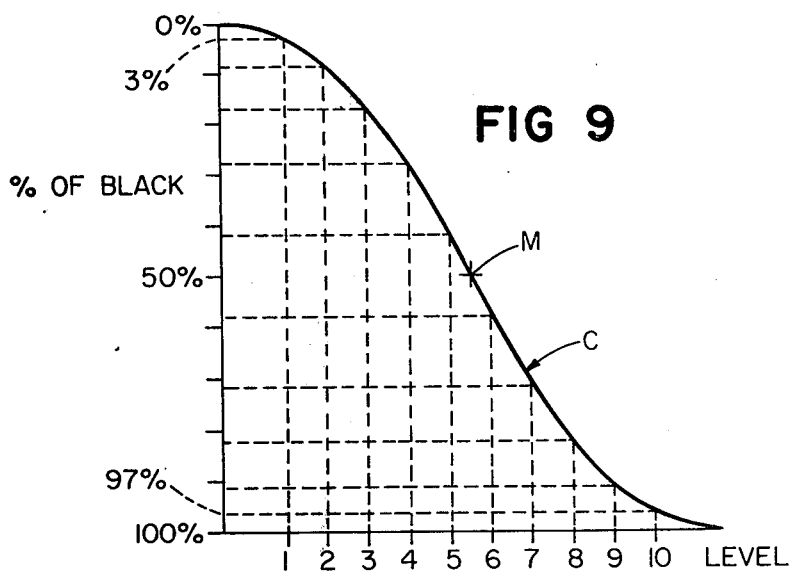

Reference is now made to FIG. 9 which illustrates the grey (tone) scale used to produce the systems of FIGS. 1 and 8. In the past, there have been two major approaches to the development of a grey scale. The first has been to vary the amount of black in each character space or area by equal quantitative steps; the second to vary the amount of black by equal percentages. In a system having ten areas, the lightest of which is 3% black and the darkest of which is 97% black (as the use of pure white and black is generally to be avoided, these are the lowest and highest percentages practical under most circumstances), the first approach results in each successive area having approximately 10.44% more of its area covered by black; the second approach results in each area having approximately 190% as much black as the preceding area. Neither approach produces a system in which the intervals between areas are visually equal. In the first, the intervals are too great at the start; in the second they are too small at the start.

The scale of FIG. 9 is a middle approach, designed to produce visually equal intervals between successive areas. An empirical study to determine how dark a series of presentations should be to give even-appearing visual steps from white to full color, or from full color to white, is reported in the *Annals of the Association of American Geographers*, Vol. 48, No. 2, June, 1958. The scale of FIG. 9 roughly corresponds to the grey spectrum curve found in that study to produce equal-appearing steps. As shown, the curve of FIG. 9 is inversely symmetrical about its midpoint M. Above the midpoint (less than 50% black), the percentage of black, PB, is given by the following formula:

$$PB = 50(d/D)^2,$$

where D is the horizontal distances from the vertical PB axis to the midpoint (M), i.e., the X (or response) coordinate of M, and d is the X coordinate of any point on the curve above M. Below the midpoint, the same formula applies in reverse.

As previously stated, the symbols of the present invention can be used with any grey scale and, regardless of the scale used, the procedure for developing a presentation is substantially the same. First, the size of the character spaces to be employed and the percentage of black in the lightest and darkest areas (the first and last levels) are selected. In the system of FIG. 8, 3.1% was chosen as the lightest area (and, to balance, 96.9% for the darkest area), so that d/D was equal to 0.25 for the first level.

Second, using the scale, the points on the horizontal axis corresponding to these percentages are marked (in the FIG. 8 system, levels 1 and 10) and the axis between these two end points is then divided into the number of equal intervals (in the FIG. 8 system, nine) required to produce the desired total number of levels (in the FIG. 8 system, ten). The percentage of black for each level may then be read off the PB axis. Alternatively, the percentages may be mathematically determined from the formula.

Finally, for each level, the proper symbol is chosen and the size of that symbol set relative to its respective character space so that, in each area, each character space will have the required percentage of black. For example, the proper symbol for the fifth level (areas 15 and 15') in the FIG. 1 and FIG. 8 systems is symbol 25 in black and the required percentage of black is 42.0%. Thus, for the fifth level, the extent of each symbol 25 relative to its character space is adjusted so that 42.0% of the character space is black. Similarly, for the seventh level (area 17') the proper symbol is symbol 24 in white, the required percentage of black is 71.9%, and each symbol is of such extent that 71.9% of its character space is black (the white symbol covering 28.1% of the black space).

It is apparent that, not only can various percentages of black be attained by varying the extent of any particular symbol, but the same black percentage can be achieved using different symbols. In both the FIG. 1 and FIG. 8 systems, for example, the required percentage of black in the sixth level, areas 16 and 16' respectively, is 58.0%. However, the proper symbol for the FIG. 1 system is symbol 26 in black, while in the FIG. 8 system the proper symbol is symbol 25 in white. Thus, in the FIG. 1 system, each black symbol 26 covers 58.0% of a white character space and, in the FIG. 8 system, each white symbol 25 covers 42.0% of a black character space.

In practice, presentations according to the present invention will be made using many different devices. For example, the presentations may be made by computer printout or other printing processes by first making type or other printing devices capable of producing the symbols and areas. The symbols and areas may also be provided using devices such as the screens disclosed in U.S. Pats. Nos. 1,820,867; 1,963,778; 2,200,203; and 2,470,093, the kits disclosed in U.S. Pat. No. 2,924,895, and the cut-out or transfer screens or tapes sold by George Smith Artist's Materials of Boston, Mass., or Alvin & Co. of Windsor, Conn. Other mechanical processes, such as photographic reproduction at the desired size, may also be used. Because of the small size and large number of the individual symbols, it is not, as a practical matter, possible to make a presentation entirely by hand.

Although the present invention has been described with reference to systems in which the colors black and white have been used for the symbols and background of the various presented areas, it is apparent that symbols and backgrounds of any other contrasting colors (including hues) may be used. In presenting up to ten characteristics, it is necessary to use only two colors. If additional colors are used, the number of characteristics presented may be greatly increased.

Other embodiments and modifications of the invention will occur to those skilled in the art and will be within the scope of the appended claims.

What is claimed is:

1. In a presentation of a plurality of characteristics, said presentation including a plurality of areas, each of said areas presenting one of said characteristics, that improvement wherein a first one of said areas comprises a regular array of a plurality of the symbol of FIG. 4 on a background of contrasting color, the extent of each of said plurality of the symbol of FIG. 4 being the same;

a second one of said areas comprises a regular array of a plurality of the symbol of FIG. 5 on a contrasting background, the extent of each of said plurality of the symbol of FIG. 5 being the same and greater than the extent of each of said plurality of the symbol of FIG. 4;

a third one of said areas comprises a regular array of a plurality of the symbol of FIG. 6 on a contrasting background, the extent of each of said plurality of the symbol of FIG. 6 being the same and greater than the extent of each of said plurality of the symbol of FIG. 5; and each of said areas includes the same number of symbols per unit area.

2. The presentation of claim 1 wherein a fourth one of said areas comprises a regular array of a plurality of the symbol of FIG. 7 on a contrasting background, the extent of each of said plurality of the symbol of FIG. 7 being the same and greater than the extent of each of said plurality of the symbol of FIG. 6.

3. The presentation of claim 2 wherein said another one of said areas comprises a regular array of a plurality of the symbol of FIG. 3 on a contrasting background, and a fifth one of said areas comprises a regular array of a plurality of the symbol of FIG. 2 on a contrasting background, the extent of each of said plurality of the symbol of FIG. 2 being the same and less than the extent of each of said plurality of the symbol of FIG. 3, and the extent of each of said plurality of the symbol of FIG. 3 being less than the extent of each of said plurality of the symbol of FIG. 4.

4. The presentation of claim 1 wherein a fourth one of said areas comprises a regular array of the symbol of one of FIGS. 2, 3 and 7 on a background of contrasting color, the extent of each of said plurality of the symbol of one of FIGS. 2, 3 and 7 being the same and being greater than the extent of said plurality of the symbol of FIG. 4 when said symbol of one of FIGS. 2, 3 and 7 is the symbol of FIG. 6, and being less than the extent of said plurality of the symbol of FIG. 4 when said symbol of one of FIGS. 2, 3 and 7 is the symbol of one of FIGS. 2 and 3.

5. The presentation of claim 1 wherein the colors of the symbols and backgrounds of each of said first one, said second one, and said third of said areas are respectively the same, and a fourth one of the said areas comprising a regular array of a plurality of the symbol of one of FIGS. 2, 3, 4, 5, 6 and 7 on a background of contrasting color, the symbols of said fourth one area being the color of the background of said first one area, and the background of said fourth one area being the color of the symbols of said first one area.

6. In a device for producing a presentation of a plurality of characteristics, said presentation including a plurality of areas each presenting one of said characteristics, that improvement comprising means for producing a regular array of a plurality of the symbol of FIG. 4 on a background of a color contrasting with the color of the produced symbols, each of said plurality of the symbol of FIG. 4 having the same extent;

means for producing a regular array of a plurality of the symbol of FIG. 5 on a contrasting background; the extent of each of said plurality of the symbol of FIG. 5 being greater than the extent of each of said plurality of the symbol of FIG. 4; and, means for producing a regular array of a plurality of the symbol of FIG. 6 on a background of color contrasting with the color of the produced symbols, each of said plurality of the symbol of FIG. 6 being of the same extent and of an extent greater than the extent of each of said plurality of the symbol of FIG. 5;

each of said areas including the same number of symbols per unit area.

7. The device of claim 6 including means for producing a regular array of the symbol of FIG. 7 on a contrasting background.

8. In a device for producing a presentation of a plurality of characteristics, said presentation including a plurality of areas each presenting one of said characteristics, that improvement comprising means for producing a regular array of a plurality of the symbol of FIG. 4 on a background of a color contrasting with the color of the produced symbols, and means for producing a regular array of a plurality of a symbol other than the symbol of FIG. 4 on a background of color contrasting with the color of the produced symbols, each of said plurality of the symbol of FIG. 4 having the same extent, each of said plurality of a symbol other than the symbol of FIG. 4 being of the same extent and of an extent different than the extent of each of said plurality of the symbol of FIG. 4, and wherein each of said areas includes the same number of symbols per unit area, said device including means for producing a regular arrays of pluralities of the symbols of each of FIGS. 2, 3, 5, 6, and 7, on backgrounds contrasting with the produced symbols, each of said plurality of the symbol of FIG. 3 being of the same extent and of an extent less than the extent of each of said plurality of the symbol of FIG. 4, each of said plurality of the symbol of FIG. 2 being of the same extent and of an extent less than the extent of each of said plurality of the symbol of FIG. 3, each of said plurality of the symbol of FIG. 5 being of the same extent and of an extent greater than the extent of each of said plurality of the symbol of FIG. 4, each of said plurality of the symbol of FIG. 6 being of the same extent and of an extent greater than the extent of each of said plurality of the symbol of FIG. 5, and each of said plurality of the symbol of FIG. 7 being the same extent and of an extent greater than the extent of each of said plurality of the symbol of FIG. 6.

* * * * *

UNITED STATES PATENT AND TRADEMARK OFFICE
CERTIFICATE OF CORRECTION

PATENT NO. : 4,148,507
DATED : April 10, 1979
INVENTOR(S) : Howard T. Fisher

It is certified that error appears in the above-identified patent and that said Letters Patent are hereby corrected as shown below:

On the title page,
"Filed: Jun. 9, 1976" should be --Filed: Jun. 9, 1975--.

*Signed and Sealed this*

*Seventeenth Day of July 1979*

[SEAL]

*Attest:*

LUTRELLE F. PARKER
*Attesting Officer*     *Acting Commissioner of Patents and Trademarks*